W. S. BLACKMER.
REGISTER MECHANISM FOR METERS.
APPLICATION FILED OCT. 25, 1915.

1,224,834.

Patented May 1, 1917.
3 SHEETS—SHEET 1.

Witnesses
A. N. Lybrand
A. F. Stevens.

Inventor
Walter S. Blackmer

By Victor J. Evans
Attorney

W. S. BLACKMER.
REGISTER MECHANISM FOR METERS.
APPLICATION FILED OCT. 25, 1915.

1,224,834.

Patented May 1, 1917.
3 SHEETS—SHEET 2.

Witnesses

Inventor
Walter S. Blackmer
By Victor J. Evans
Attorney

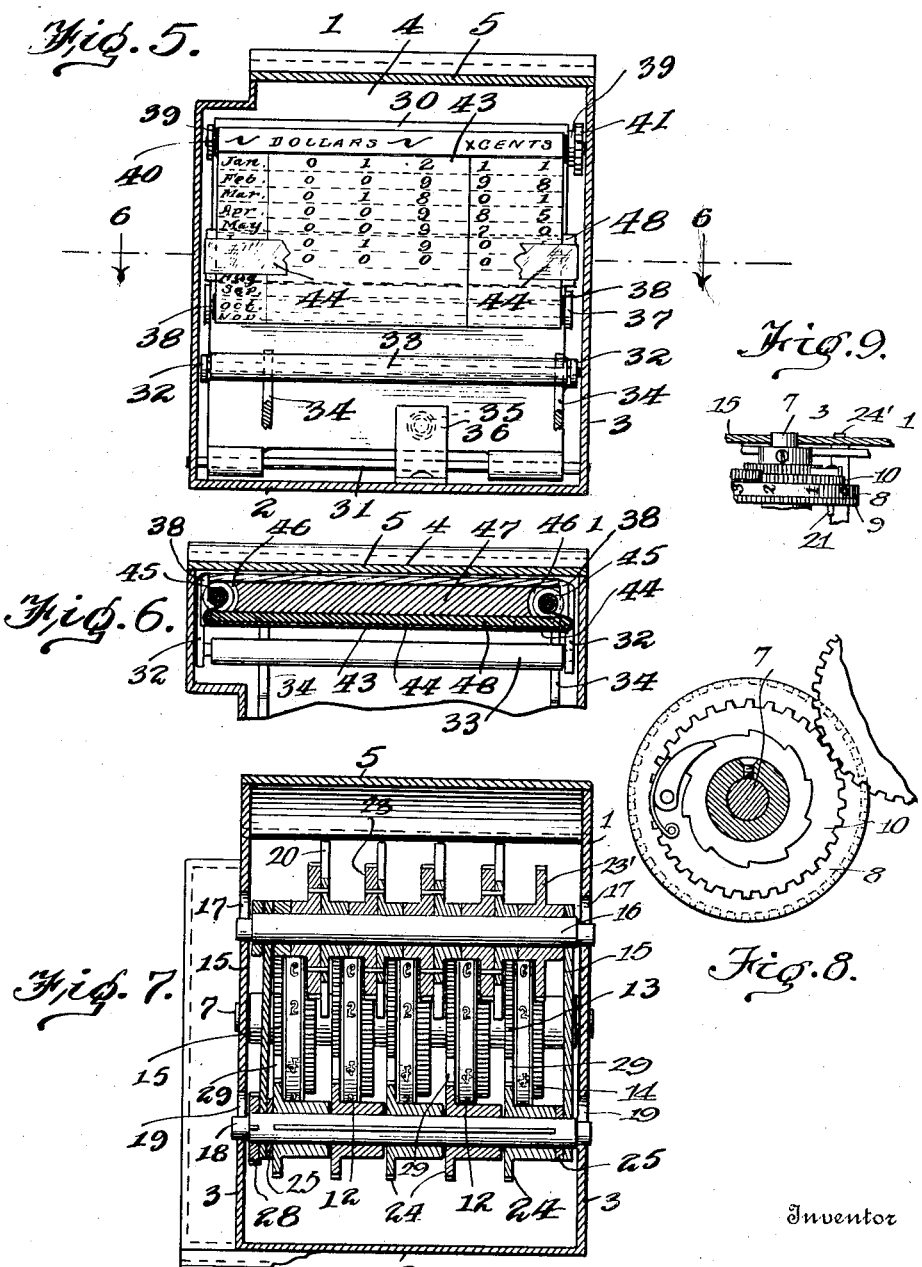

UNITED STATES PATENT OFFICE.

WALTER S. BLACKMER, OF SALISBURY, NORTH CAROLINA.

REGISTER MECHANISM FOR METERS.

1,224,834.  Specification of Letters Patent.  Patented May 1, 1917.

Application filed October 25, 1915. Serial No. 57,813.

*To all whom it may concern:*

Be it known that I, WALTER S. BLACKMER, a citizen of the United States, residing at Salisbury, in the county of Rowan and State of North Carolina, have invented new and useful Improvements in Register Mechanism for Meters, of which the following is a specification.

This invention relates to improvements in registering mechanism for meters for measuring water, electricity and other fluids.

In carrying out the present invention, it is my purpose to provide a registering mechanism for meters which will indicate the consumption of the fluid or other material in dollars and cents in contradistinction to quantity as is now indicated by meters in general use, so that the average layman will at all times be able to determine the exact charge for the fluid consumed, thereby reducing the possibility of mistakes in rendering bills.

Another object of my invention is to provide registering and recording mechanism for meters which will operate efficiently and effectively under all conditions, wherein the component parts will be so arranged and correlated as to reduce the possibility of derangement to a minimum and enable access to be readily had to the mechanism for repairing and cleaning, and which may be manufactured and installed at small cost.

With the above and other objects in view, the invention consists in the construction, combination and arrangement of parts hereinafter set forth in and falling within the scope of the claims.

In the accompanying drawings:

Fig. 5 is a vertical sectional view on the line 5—5 of Fig. 4.

Fig. 6 is a horizontal sectional view on the line 6—6 of Fig. 5.

Fig. 7 is a vertical sectional view on the line 7—7 of Fig. 4.

Figure 4:
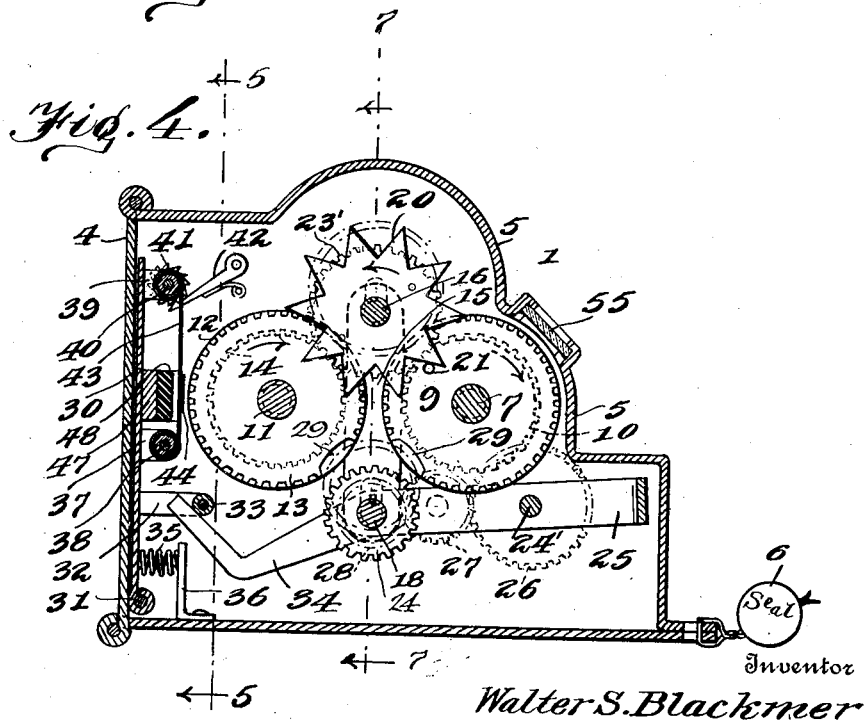
Fig. 4 is a vertical sectional view through the mechanism.

Referring now to the drawings in detail, 1 designates a casing comprising a bottom wall 2, end walls 3, 3 upstanding from the bottom wall and suitably spaced apart and preferably, although not necessarily, formed integral with such bottom wall, a back wall 4 pivoted to the rear edge of the bottom wall and upstanding therefrom, and a section 5 forming the top and front walls of the casing and having the upper edge pivoted to the back wall and the lower end fastened to the bottom wall by means of a seal 6 or other securing device. Extending across the casing 1 adjacent to the front side thereof and secured to the side walls of the casing is a shaft 7 and loosely mounted upon the shaft 7 are indicator wheels 8 suitably spaced apart and each having the periphery thereof provided with an annular row of consecutive numbers. These indicating wheels are preferably spaced apart equal distances and secured to one side of each wheel is a spur gear 9 arranged concentrically of the shaft and of a diameter approximately equal to the diameter of the indicator wheel, while secured to the opposite side of each indicator wheel is a relatively small spur gear 10 arranged concentrically of the shaft. Also extending across the casing and adjacent to the back wall thereof and disposed in parallelism with the shaft 7 is a shaft 11 and loosely mounted upon the shaft 11 are printing disks 12 corresponding in number to the disks 8 and each having the periphery thereof provided with an annular row of consecutive numbers corresponding to the numbers on the corresponding indicator disks. Secured to one side of each printing disk is a spur gear 13 of a diameter approximately equal to the similar dimension of the printing disk and fastened to the opposite side of each printing disk is a relatively small spur gear 14, the spur gears 13 and 14 being arranged concentrically of the shaft 11. Arranged adjacent to the inner surfaces of the side walls 3 of the casing are vertical links 15, 15 respectively and mounted in horizontally alining openings formed in the upper end of the links 15 is a shaft 16 having the ends thereof projecting through vertical slots 17 formed in the side walls of the casing, and mounted in horizontally alining openings formed in the lower ends of the links 15 is a shaft 18 having the ends thereof working within vertical slots 19 formed in the side walls of the casing. The links 15 and the shafts 16 and 18 are arranged centrally of the space between the shafts 7 and 11, as clearly illustrated in Fig. 4 of the drawings, and loosely mounted upon the shaft 16 are star wheels 20 arranged between the disks on the shafts 7 and 11 and adapted to engage the pins 21 carried by the respective register disks. Fixed to each star wheel 20 and arranged concentrically of the shaft 16 is a spur gear 23 normally meshing with the gears 10 and 14 of the adjacent register and counterdisks, the spur gear 23 of each star wheel meshing with the gears 10 and 14 of the adjacent register and counterdisks opposite from the similar disks carrying the pins controlling the star wheel connected to such gear 23, as clearly illustrated in Figs. 4 and 7 of the drawings. Loosely mounted upon the shaft 16 and meshing with the spur gears 10 and 14 on the units register and recorder wheels is a spur gear 23' whereby motion may be transmitted from the units wheel in the register set to a corresponding wheel in the recorder set in order that both of such wheels will rotate synchronously. Keyed upon the lower shaft 18 are spur pinions 24 corresponding in number to the register disks and adapted to mesh with the gears 9 and 13 carried by the register and printing disks and normally disengaged from such gears. Arranged across the casing and secured to the opposite side walls thereof adjacent to the bottom wall and between the front wall and the shaft 7 is a pivot rod 24', while pivoted upon the rod 24' is a yoke 25 having the limbs thereof arranged adjacent to the respective side walls 3 and the central portion disposed adjacent to the front wall, as shown in Fig. 4. The limbs of the yoke 25 are also formed with openings that receive the lower shaft 18, as shown in Fig. 7 so that when the central member of the yoke is depressed and the yoke swung about the rod 24', the links 15 will be elevated to disengage the star wheels and the spur gears associated therewith from the register and printing disks and engage the spur pinions 24 with the gears 9 and 13 of the register and indicating disks, as shown by the dotted lines in Fig. 4. Rotatably mounted upon the rod 24' adjacent to one limb of the yoke is a spur gear 26 adapted to be revolved by the thumb or finger and meshing with an idler pinion 27 mounted upon such limb of the yoke and meshing with a pinion 28 keyed upon the shaft 18 at one end thereof. The peripheries of the spur gears 9 and 13 respectively are formed with cut out portions 29. The star wheels and spur gears associated therewith constitute what may be called a transfer mechanism whereby motion may be imparted from the register wheels or disks to the recorder disks so that both sets of disks will rotate in syncronism, while the pinions keyed upon the shaft 18 and the parts associated with such shaft and pinions constitute a resetting mechanism whereby the recorder wheels and the register wheels may be restored to zero position.

30 designates a vertical plate disposed adjacent to the back wall of the casing and having the lower end thereof pivoted upon a rod 31 carried by the side walls of the casing and extending across the latter. Formed on the plate 30 at the opposite side edges thereof adjacent to the lower end and projecting outwardly from the plate are arms 32 and journaled in the outer ends of the arms 32 is a roller 33 extending across the plate. The extremities of the limbs of the yoke 25 are bent upwardly as at 34 and engage the roller 33 so that when the yoke is depressed as previously described the plate 30 will be swung toward the printing rollers. The plate 30 is normally held in vertical position by any suitable means. In the present instance, I employ a coiled expansion spring 35 interposed between the plate and the bracket 36 carried by the lower wall of the casing. Journaled in bracket arms 37 carried by the plate 30 is a horizontal roller 38 arranged at a point approximately centrally of the plate and extending across the latter, while journaled in bracket arms 39 carried by the plate adjacent to the upper end thereof is a roller 40 and fixed upon one end of the roller 40 is a ratchet wheel 41 normally engaged by a spring pressed dog 42 pivoted upon the adjacent side wall of the casing. Secured to the rollers 40 and 38 and wrapped thereabout are the end portions of a strip of paper 43 spanning the space between the rolls 40 and 38 and adapted to move toward the printing disks with the plate 30. Extending across the paper strip 43 between the latter and the printing disks is a printing ribbon 44 having the opposite ends thereof secured to and wrapped about spools 45 rotatably mounted within recesses 46 formed in the side edges of a strip 47 secured to the plate 30 and fastened to the face of the strip 47 immediately behind the paper is a pad 48 formed of rubber or other similar material. The inking ribbon 44 is arranged in juxtaposition to the adjacent printing elements on the disks so that when the plate is swung toward the disks the impression will be transferred to the paper.

Keyed upon one end of the shaft 7 is a bevel pinion 49 meshing with a similar pinion 50 secured to the upper end of a vertical shaft 51 journaled in a bearing 52 carried by the adjacent side wall 3 of the casing and secured to the lower end of the vertical shaft 51 is a spur gear 53 meshing with a similar gear 54 suitably connected to the meter mechanism so that motion will be transmitted to the shaft 7 from the meter mechanism as the latter is actuated by the fluid passing through the meter.

The front portion of the section 5 of the casing is formed with a sight opening extending across such section adjacent to the peripheries of the register disks 8 and arranged within the sight openings is a transparent plate 55 formed of glass or analogous material.

Figure 1:
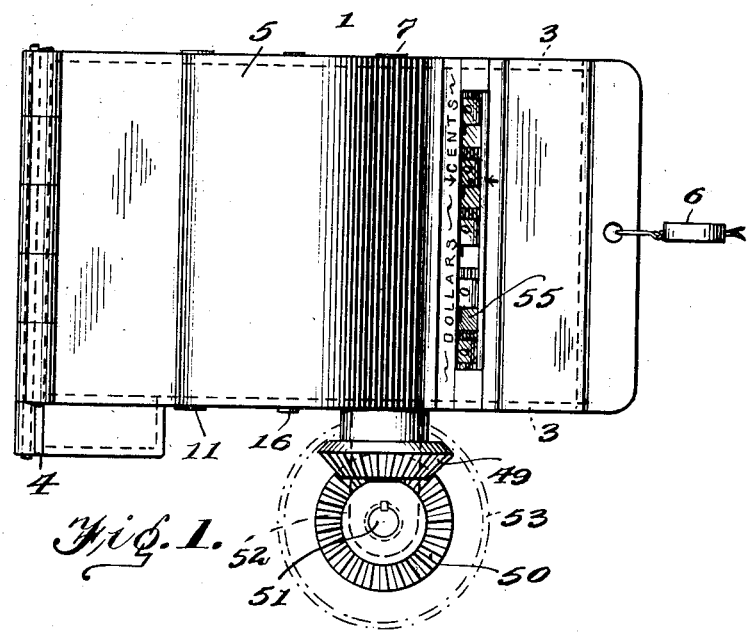
Figure 1 is a top plan view of registering and recording mechanism constructed in accordance with the present invention.
Figure 2:
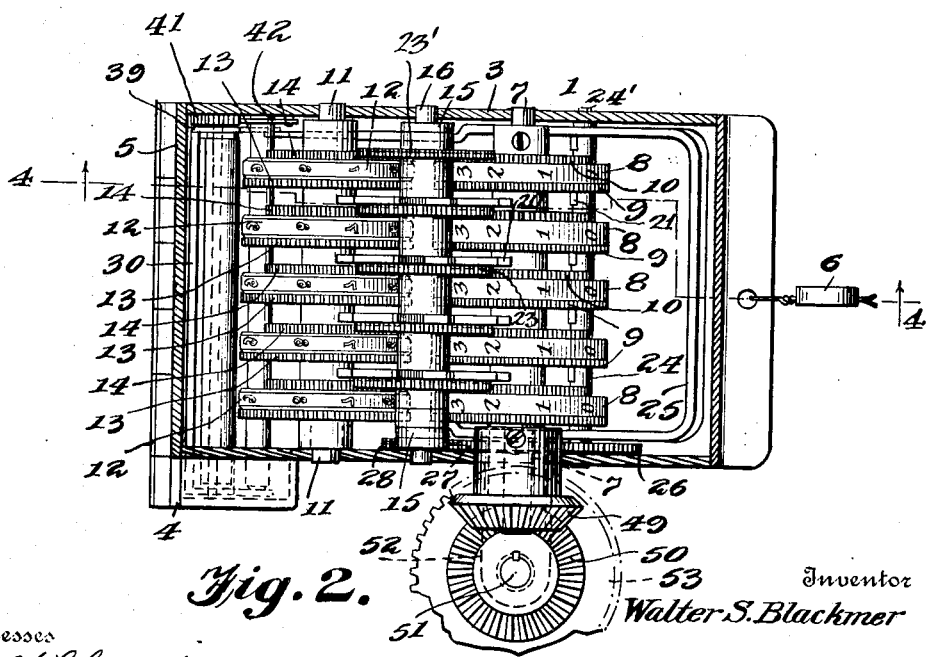
Fig. 2 is a horizontal sectional view therethrough.
Figure 3:
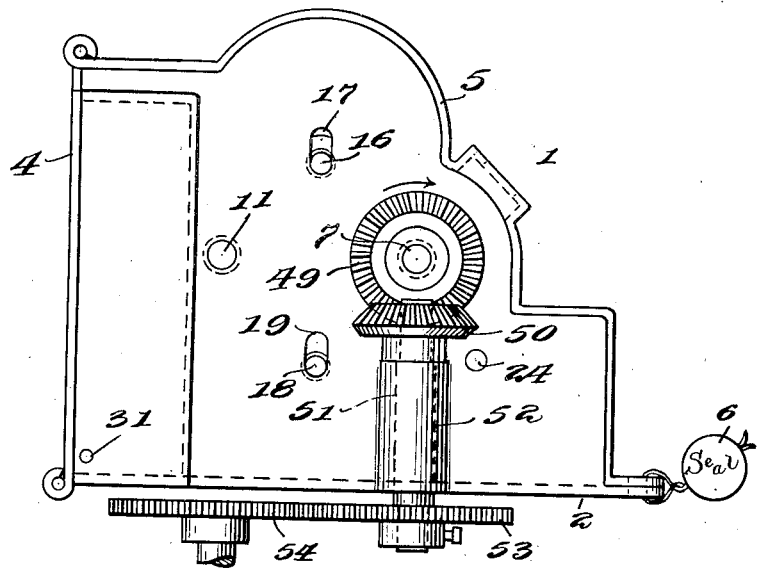
Fig. 3 is a view in side elevation of the same.

In the present instance, the paper 43 has the names of the months of the year inscribed thereon, as shown in Fig. 5, and these names are arranged adjacent to one edge of the paper, while the paper is divided transversely into columns indicative of "dollars" and "cents," as shown in Fig. 5, while the front portion of the section 5 immediately above the sight opening is inscribed with the legends "Dollars" and "Cents," as shown in Fig. 1 of the drawings.

The numerals on the register disks and the printing disks indicate "dollars" and "cents" in contradistinction to quantity and in the operation of the meter mechanism by the fluid the shaft 7 is revolved. In the initial rotation of the shaft 7 the units register disk is revolved, while in the continued rotation of the shaft this motion is transmitted from the units disk to the tens disk and from the tens disk to the hundreds disk and so on throughout the series through the medium of the pins and star wheels, as is readily understood. In the rotation of the various disks in the register series, motion is transmitted through the medium of spur gears 23 and the star wheels 20 to the corresponding disks in the printing series so that the type on the printing disk in juxtaposition to the ribbon will correspond to the numbers visible through the sight opening in the front wall of the casing. When the meter inspector reads the meter through the sight opening, he presses down on the interconnecting member of the yoke 25, thereby swinging the plate 30 as previously described so that the type on the printing disk in juxtaposition to the inking ribbon will be impressed on the paper strip, thereby forming permanent record from time to time so that the consumer will be protected in the event of error. In the forward movement of the plate 30 under the action of the yoke, the dog 42 idles over the adjacent tooth of the ratchet wheel 41, while in the backward movement of the plate, said dog rotates the ratchet wheel to advance the strip of paper to bring the name of the next month into alinement with the type on the printing disks.

In the swinging of the yoke, the links 15 are elevated and lift the shafts 16 and 18, thereby disengaging the gear wheels and the star wheels on the shaft 16 from the register and printing disks and engaging the pinions 24 with the gear wheels 9 and 13. In this position of the parts, the gear 26 is rotated by hand and motion transmitted to the shaft 18 through pinion 27 and pinion 28, thereby revolving the register disks and printing disks to restore the same to zero position and when the various disks reach zero position the cut out portions 29 move into juxtaposition to the toothed surfaces of the pinions 24 so that the disks will be relieved of the influence of such pinions.

While I have herein shown and described one preferred form of my invention by way of illustration, I wish it to be understood that I do not limit or confine myself to the precise details of construction herein described and delineated, as modification and variation may be made within the scope of the claims and without departing from the spirit of the invention.

I claim:

1. Registering and recording mechanism for meters comprising a set of counter disks, spur gears connected to said counter disks, respectively, concentrically to the axes thereof and each having a portion of the periphery cut out, a set of printing disks corresponding to the counter disks, spur gears connected to said printing disks, respectively, concentrically of the axes thereof and each having a portion of the periphery cut out, means for transmitting motion from one set of disks to the other, a shaft carrying said means and arranged above said disks, a second shaft arranged below said disks, vertical links interconnecting said shafts, pinions on said lower shaft adapted to mesh with corresponding spur gears, respectively, and normally out of engagement with such gears, and means for moving said shafts bodily to render said transmitting means inactive and engage said pinions with the corresponding spur gears, whereby upon the rotation of the second named shaft, the counter disks and printing disks may be restored to zero position, the cut out portions of said spur gears moving into juxtaposition to said pinions when said disks are in zero position.

2. Registering and recording mechanism for meters comprising a set of counter disks, spur gears connected to said counter disks, respectively, concentrically to the axes thereof and each having a portion of the periphery cut out, a set of printing disks corresponding to the counter disks, spur gears connected to said printing disks, respectively, concentrically of the axes thereof and each having a portion of the periphery cut out, means for transmitting motion from one set of disks to the other, a shaft carrying said means and arranged above said disks, a second shaft arranged below said disks, vertical links interconnecting said shafts, pinions on said lower shaft adapted to mesh with corresponding spur gears, respectively, and normally out of engagement with such gears, means for moving said shafts bodily to render said transmitting means inactive and engage said pinions with the corresponding spur gears, whereby upon the rotation of the second named shaft, said counter disks and printing disks may be restored to zero position, the cut out portions of said spur gears moving into juxtaposition to said pinions when said disks are in zero position, a yoke connected to said lower shaft and fulcrumed for swinging movement for moving said shafts, and means on said lower shaft for rotating the latter to reset said disks.

3. Registering and recording mechanism for meters comprising a set of counter disks, a set of printing disks, corresponding to the counter disks and arranged alongside of the latter, means above said disks and between the same for transmitting motion from the disks of one set to the disks of the other set, means disposed below said disks between the latter and movable into engagement therewith to reset said disks to zero position, and connections between said last named means and first named means whereby the first named means will be drawn into inactive position in the movement of the second named means into resetting position.

In testimony whereof I affix my signature in presence of two witnesses.

WALTER S. BLACKMER.

Witnesses:
  THOS. B. MARSH, Jr.,
  W. C. MAUPIN.